Aug. 20, 1929. H. O. JOHNSON 1,725,195
HOOK OR LINK
Filed April 19, 1928
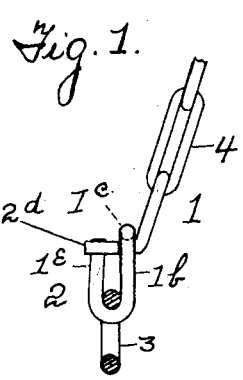
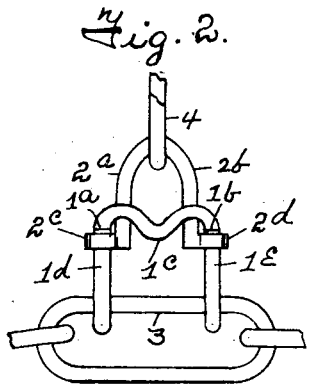
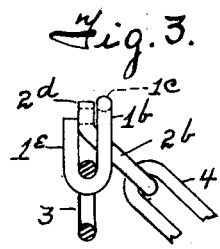
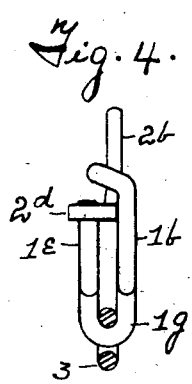
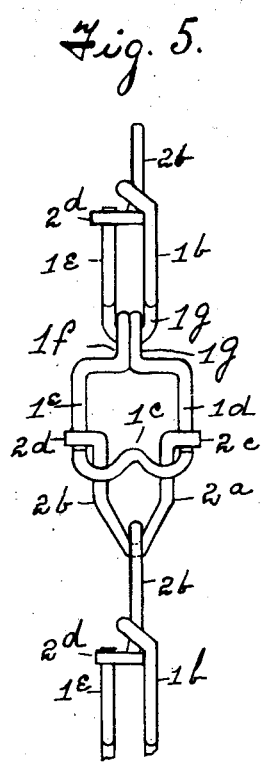
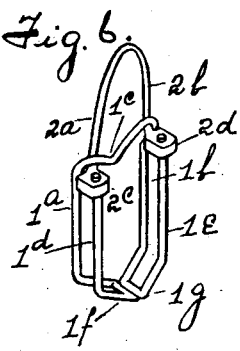
Witnesses
Alice R. Mook
Sarah O. Paulson
INVENTOR.
Henry O. Johnson
BY James T. Watson
ATTORNEYS.

Patented Aug. 20, 1929.

1,725,195

UNITED STATES PATENT OFFICE.

HENRY O. JOHNSON, OF VIRGINIA, MINNESOTA.

HOOK OR LINK.

Application filed April 19, 1928. Serial No. 271,274.

My invention relates to hooks for securing chains together, or for use as links for forming chains, and has for its object a simple hook adapted to be easily attached or detached for connecting together the side and across tire members of automobile anti-skid chains. With this and other objects in view, it consists of the structures, combinations and arrangements of parts hereinafter described and claimed.

In the drawings, Fig. 1 is a side elevation of one form of my said invention showing the same engaged with links of the side and across tire members, partly in transverse section, of an anti-skid chain. Fig. 2, is a front elevation of the same. Fig. 3 is a side elevation showing the hereinafter described members of my said invention in process of being assembled or of being separated. Fig. 4, is a side elevation of a modified form of said invention. Fig. 5, is a front elevation of a plurality of said hooks of modified form connected together to form a chain. Fig. 6, is a perspective view of said modified form of my invention.

In the drawings, my invention is disclosed as a hook embodying separatable head and foot members 1 and 2 respectively. Said foot portion comprises the parallel shank portions 1$^a$ and 1$^b$, which are joined together at one end by the cross bar 1$^c$. The opposite ends of said shanks are bent and merged into post portions 1$^d$ and 1$^e$, respectively, which extend approximately parallel with said shank portions and approximately toward said cross bar. Said cross bar preferably is approximately M-shaped.

The head member of said hook is approximately A-shaped, and comprises the side arms 2$^a$ and 2$^b$, respectively, converging and joining together at one end and spaced from each other at their opposite ends at which they are provided with angular loops or apertured flanges 2$^c$ and 2$^d$, respectively, adapted to engage said posts. Said arms are preferably inclined backward from said loops or flanges.

The modified form shown in Figs. 4, 5, and 6, are of substantially similar structure to the form shown in Figs. 1, 2 and 3 except that in the modified form the upper ends of the shanks and the cross bar are tilted slightly forward, the side arms of the head member above said cross arm are substantially vertical and the merged ends of the posts and shanks of the foot member are pinched toward each other to form centrally disposed loops 1$^f$ and 1$^g$, respectively.

In operation in connection with said non-skid chain, the foot portion of my hooks is engaged, as shown, with a link, 3, of the side member of the non-skid chain. The head member of my hook is engaged with a link, 4, of the across tire member of said non-skid chain. The head member and foot member of my hook are then connected together by passing the loops or apertured flanges forward below the cross bar and upward and over and around said posts, as partly shown in Fig. 3 and as further shown in Figs. 1 and 2. The procedure is reversed in order to detach said hook or said non-skid chains.

When it is desired to engage my said hooks together to form a chain, the hooks may be all assembled and connected together right side up. But if desired said hooks may be alternately right side up and inverted, as shown in Fig. 5.

It will be observed that the cross bar of my said hook forms a fulcrum for the head portion, the effect of which is to press the apertured flanges or loops of the side arms down around said posts and keep them in engagement when longitudinal tension is applied to said head member. The middle bend of said M-shaped cross arm assists in preventing the opposite posts and side arms from drawing together when tension is applied.

Heretofore it has usually been the practice to hook the side member and an across tire member of an anti-skid chain together with an open hook and then close the open end of the hook by hammering it. Such method is a laborious one, and makes it exceedingly difficult to remove the skid chain when it is desired to do so.

My invention can be quickly applied and quickly removed. When applied to a loose non-skid chain, the side arms of the head portion will lie against the side of the tire which will prevent it from falling into disengaging position, as in Fig. 3.

My hook is adaptable for use as the terminal hook or link on hoisting chains, or for connecting two ends of chains together or one end of a chain, hook, or link to a suspending rod, and for various other purposes, and may be modified in form, proportions, dimensions and other particulars within the spirit and scope of certain of my claims.

What I claim is—

1. A hook comprising a foot member embodying shank portions connected at one end by a cross bar and merged at their opposite ends with posts extending approximately toward said cross bar, and a detachable head member embodying side arms connected together at one end and provided at their opposite ends with apertured angular portions adapted to extend beneath the cross bar of said foot portion and to engage said posts respectively.

2. A hook comprising a foot member embodying shank portions connected at one end by an approximately M-shaped cross bar and bent and merged at their opposite ends with post portions extending substantially parallel with said shank portions and approximately toward said cross bar, and an approximately A-shaped detachable head portion provided with angular terminals having eyes formed therein adapted to extend beneath said cross bar and to engage said posts, respectively.

3. A hook comprising a foot member embodying shank portions connected at one end by a cross bar and bent and merged at their opposite ends with post portions extending substantially parallel with said shank portions and approximately toward said cross bar, and a detachable head member embodying side arms connected together at one end and provided at their opposite ends with angular portions having eyes formed therein adapted to extend beneath said cross bar and to engage said posts respectively, said cross arm being adapted to form a fulcrum for said side arms and said side arms being adapted to bear against said fulcrum.

4. A hook comprising a foot member embodying side shanks connected together at one end by a cross bar and bent and merged at their opposite ends with corresponding centrally disposed loops, said loops being merged at their opposite ends with corresponding side posts extending substantially parallel to said shanks and approximately toward said cross bar, and a detachable head member comprising side arms connected together at one end and provided with angular eye portions at their opposite ends adapted to extend beneath said cross bar and to engage the free ends of said posts, respectively.

In testimony whereof, I hereunto affix my signature.

HENRY O. JOHNSON.